United States Patent Office 3,497,181
Patented Feb. 24, 1970

3,497,181
COMPOSITIONS STABILIZED WITH AN ARYLOXY (ALKYLOXY) ALKANE
Milton Braid, Barrington, N.J., assignor to Mobil Oil Corporation, a corporation of New York
No Drawing. Continuation-in-part of application Ser. No. 500,368, Oct. 21, 1965. This application June 30, 1967, Ser. No. 650,173
Int. Cl. C10m 5/12; C08c 11/32
U.S. Cl. 252—52
21 Claims

ABSTRACT OF THE DISCLOSURE

Organic substances, normally susceptible to oxidative deterioration are protected by the presence of a minor amount of an aryloxy (alkyloxy) alkane.

CROSS-REFERENCE TO RELATED APPLICATIONS

This application is a continuation-in-part application of U.S. Ser. No. 500,368, filed on Oct. 21, 1965, which is in turn a continuation-in-part application of U.S. Ser. No. 471,401, filed on July 21, 1965, both of which are now abandoned.

BACKGROUND OF THE INVENTION

Field of the invention

This invention relates to compositions stabilized against oxidative deterioration. More specifically, the invention has to do with organic compositions prone to oxidation, containing novel antioxidants.

Description of the prior art

As is well known, mineral oils and synthetic oils tend to oxidize in storage and in use, especially when subjected to heat and oxidizing conditions, such as are encountered in internal combustion engines. The oxidation products formed in the oil are acidic in nature and exert a corrosive action on the metal surfaces being lubricated. Oxidation is also indicated by an increase in viscosity of the oil, thereby materially changing the character of the oil.

Correspondingly, many plastics are susceptible to oxidation and suffer color change, softening, hardening by polymerization, cross-linking, embrittlement, cracking, crazing, reduced tensile strength, loss of electrical properties, etc. Such changes in character make the plastics less saleable from an aesthetic standpoint, particularly when the plastics are used as surface coatings or the packaging, and less desirable for other applications. As used herein, the term "plastics" is used broadly to include resins.

Various polymeric materials, including particularly those produced by polymerization of a polymerizable mixture containing at least one olefinic hydrocarbon, have in recent years become important in the manufacture of many useful articles. Such articles are generally manufactured and often used under conditions in which there is a tendency for the polymers to become oxidized. Particularly when those conditions include an elevated temperature, such as those employed to facilitate extrusion, molding or rolling of polymeric materials into useful configurations or those encountered in uses such as electrical insulation, the polymeric material usually undergoes oxidative degradation, which customarily results in an undesirable reduction of the tensile strength, flexibility or other advantageous properties of the polymeric material. This is particularly evidenced by high-impact polystyrenes, which are formed by copolymerizing a rubbery material, such as a natural or a synthetic rubber.

Various anti-oxidants and stabilizers have been incorporated in such polystyrenes in the past to inhibit such oxidative degradation. Many of such additives have been insufficiently effective, while many others have caused undesirable side effects, such as excessive degradation of the color of the polymeric material and excessive change in the melt index (M.I.).

Still other materials are susceptible to oxidation, including food stuffs, edible oils, soaps, waxes, cosmetics, essential oils and perfume bases.

The present invention, therefore, is directed to inhibiting compositions prone to oxidation by incorporating therewith small amounts of unusually effective compounds serving as antioxidants.

SUMMARY OF THE INVENTION

In accordance with the invention, there are provided compositions of matter comprising:

(A) A material susceptible to oxidative deterioration, and (B) A minor amount sufficient to inhibit oxidation of (A), of an aryloxy (alkyloxy) alkane represented by a general formula selected from the group consisting of I, II, III and IV.

I. 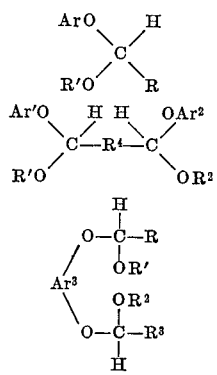

II.

III.

and

IV. 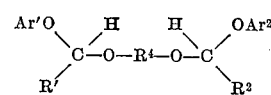

wherein

R, R', $R^2$ and $R^3$ are alkyl groups having from 1 to about 20 carbon atoms, $R^4$ is an alkylene group having from 1 to about 20 carbon atoms, Ar, A' and $Ar^2$ are aryl groups, and $Ar^3$ is an arylene group.

All of the R groups, R through and inclusive of $R^4$, can be straight chains or branched chain groups. Further, R through $R^3$ can be the same or different groups in a compound. Correspondingly, in general Formula II, Ar' and $Ar^2$ can be the same or different aromatic groups.

DESCRIPTION OF SPECIFIC EMBODIMENTS

In accordance with the invention, there are provided compositions comprising a material susceptible to oxidative deterioration so inhibited with the alkanes identified above by general Formulae I, II, III and IV.

ARYLOXY (ALKYLOXY) ALKANES

The additives used herein are, as indicated, aryloxy (alkyloxy) alkanes and can also be regarded as mixed acetals. They are prepared, for example, by reaction of a hydroxy-aromatic compound such as a phenol, and an alkyl alkenyl ether according to the following:

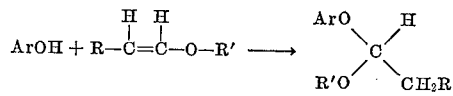

wherein Ar, R and R' are as defined above.

If desired, the alkanes of this invention may also be prepared by reacting an alkali metal salt of the hydroxy-aromatic compound with a halogenated alkyl alkyl ether. In this reaction, a metal halide is produced and an aryloxy group replaces the halogen atom on the ether.

Typical hydroxy-aromatic compounds useful in preparing the alkanes include: phenol, methyl phenols, nonyl phenols, aminophenols, N-phenylamino-phenols, hydroquinone, catechol, naphthols, octyl 1-naphthol, and alkali metal salts thereof.

Representative of alkyl alkenyl ethers and halogenated derivatives thereof which can be used to form the alkanes are: n-butyl vinyl ether; 1,4-di(vinyl-oxy) butane; vinyl benzyl ether; hydroquinone divinyl ether; and 1,5-di-n-butoxy-1,5-dichloropentane.

Illustrative alkanes include:

1-n-butoxy-1-(1-naphthoxy)ethane
1-n-butoxy-1-(2-naphthoxy)ethane
1-n-butoxy-1-(4-phenylaminophenoxy)ethane
1-n-butoxy-1-(4-methylphenoxy)ethane
2,9-di(1-naphthoxy)-3,8-dioxadecane
2,9-di-(4-phenylaminophenoxy)-3,8-dioxadecane
1,2-di($\alpha$-butoxyethoxy)benzene
1,4-di($\alpha$-butoxyethoxy)benzene
6,10-di-(1-naphthoxy)-5,11-dioxapentadecane It is to be understod that one or more hydroxy-aromatic compounds can be reacted with one or more of the alkyl alkenyl ethers to form an individual alkane or a mixture of alkanes, and that the individual alkane or mixture of alkanes can be used to stabilize the compositions of this invention.

Reaction conditions used in forming the alkanes can be varied considerably. The temperature of reaction can range from about 20° C. to about 150° C., preferably 50–80° C. Reaction times can vary from several minutes to about 24 hours, 0.5 hour to 2 hours being preferred. Although pressure does not appear to be critical, atmospheric pressure is generally employed and super atmospheric pressures are employed with volatile alkenyl ether reactants. Reaction proceeds satisfactorily without a catalyst, but an acid catalyst such as p-toluene-sulfonic acid can be used, particularly with less reactive phenol reactants such as hydroquinone. Reaction can be carried out without a solvent; however, unreactive materials including benzene, ethers, glycol ethers, cyclohexane, heptane and hydrocarbon oils can be used as solvents.

The alkanes formed by following the foregoing reaction conditions are preferably treated with a basic substance to remove any unreacted phenol or acidic catalyst. Washing of an alkane reaction product with dilute aqueous sodium hydroxide or sodium carbonate solutions is a convenient means.

COMPOSITIONS PRONE TO OXIDATION

Lubricating oils contemplated herein can vary widely in origin and characteristics, and can vary as well dependent upon the use which is to be made of them. Naphthenic base, paraffin base, Coastal base, and mixed base mineral oils are representative. Other hydrocarbon lubricants include lubricating oils derived from coal products, and alkylene polymers such as polymers of propylene, butylene, or the like, and mixtures thereof. Synthetic oils other than composed of hydrogen and carbon include: alkylene oxide polymers, polysiloxanes (silicones), aromatic ethers, dicarboxylic acid esters, liquid esters of phosphorus, polypropylene glycol, di(2-ethyl hexyl) sebacate, di-(2-ethyl hexyl) adipate, trimethylolpropane tricaprylate and related esters of pentaerythritol and neopentyl glycol. In general, the hydrocarbon oils and synthetic vehicles which can be used herein are characterized by a viscosity (SUS) of at least 25 seconds at 38° C. (100° F.), preferably from 60 to 6000 seconds at 38° C.

Thus, in the lubricant fields, the alkanes can be used to stabilize motor oils, cutting oils, roll oils, emulsion-type oils such as marine diesel oils, greases and waxes.

As particularly indicated above, the alkanes can also be used to stabilize grease compositions. Such compositions can be comprised of one or more of the lubricating oil mentioned above and of one or more thickening agents.

A wide variety of thickening agents can be used in the greases of this invention. Included among the thickening agents are alkali and alkaline earth metal soaps of fatty acids and fatty materials having from about 12 to about 30 carbon atoms per molecule. The metals are typified by sodium, lithium, calcium and barium. Fatty materials are illustrated by stearic acid, hydroxystearic acid, stearin, cottonseed oil acids, oleic acid, palmitic acid, myristic acid and hydrogenated fish oils.

Other thickening agents include salt and salt-soap complexes as: calcium stearate-acetate (Patent No. 2,197,263); calcium stearate-caprylate-acetate complexes (Patent No. 2,999,065); calcium caprylate-acetate (Patent No. 2,999,066); and calcium salts and soaps of low-, intermediate- and high-molecular weight acids and of nut oil acids.

Another group of thickening agents comprise substituted ureas, phthalocyamines, indanthrene, pigments such as perylimides, pyromellitdiimides and ammeline.

The preferred thickening or gelling agents employed in the new grease compositions are essentially, hydrophobic clays. Such thickening agents can be prepared from clays which are initially hydrophilic in character, but which have been converted into a hydrophobic condition by the introduction of long chain hydrocarbon radicals into the surface of the clay particles, prior to their use as a component of a grease composition, as, for example, by being subjected to a preliminary treatment with an organic cationic surface active agent, such as an onium compound. Typical onium compounds are tetra alkyl ammonium chlorides, such as dimethyl dioctadecyl ammonium chloride, dimethyl dibenzyl ammonium chloride and mixture thereof. This method of conversion, being well known to those skilled in the art, is believed to require no further discussion, and does not form a part of the present invention. More specifically, the clays which are useful as starting materials in forimng the thickening agents to be employed in the grease compositions, can comprise the naturally occurring chemically unmodified clays. These clays are crystalline complex silicates, the exact composition of which is not subject to precise description, since they vary widely from one natural source to another. These clays can be described as complex inorganic silicates such as aluminum silicates, magnesium silicates, barium silicates, and the like, containing, in addition to the silicate lattice, varying amounts of cation-exchangeable groups generally sodium. Hydrophilic clays which are particularly useful for conversion to desired thickening agents include montmorillonite clays, such as bentonite, attapulgite, hectorite, illite, saponite, sepiolite, biotite, vermiculite, zeolite clays, and the like. The thickening agent is employed in an amount from about 0.5 to about 30, and preferably from 3 percent to 15 percent by weight of the total grease composition.

It is to be understood, however, that the compositions contemplated herein can also contain other characterizing materials. For examples, corrosion inhibitors, extreme pressure agents, viscosity index agents, and fillers, can be used. Among such materials are colloidal silica, salcium acetate, calcium carbonate and molybdenum disulfide. These characterizing materials do not detract from the lubricating value of the compositions of this invention, nor do they detract from the beneficial character of the alkanes; rather, these characterizing materials serve to impart their customary properties to the particular compositions in which they are incorporated.

Plastics susceptible to oxidation are contemplated herein. Typical plastics include:
cellulose nitrate, acetate, propionate and propionate-butyrate;
methyl, ethyl and benzyl cellulose;
casein;
phenol-, urea- and melamine-formaldehyde;
alkyds such as glycerol-phthalic acid;
vinyl acetate and vinyl chloride;
acrylic and methacrylic esters;
rosin;
silicone polymers such as polysiloxanes;
polyethylene, polypropylene and polystyrene.

To illustrate the invention further, polystyrenes preferred herein are those having high impact resistance. They are comprised of polystyrene and a rubber, natural or synthetic, generally in the proportions of 1 to 10, and preferably about 5, parts by weight of rubber per 100 parts by weight of styrene monomer. Typical of such high-impact polystyrenes is one formed from 950 parts of a synthetic rubber (predominantly butadiene) and 12,000 parts of styrene monomer, and having: a melt index of 0.29 and an Izod Test of 2.8.

Details relative to suitable polystyrenes are available in the following text: Styrene: Its Polymers, Copolymers and Derivatives; Boundy and Boyer; Rheinhold Publishing Company; New York, 1960.

As indicated above, other materials are prone to oxidation and are contemplated herein. These include foodstuffs, edible oils, soaps, waxes, cosmetics, essential oils and perfume bases.

CONCENTRATIONS

The concentrations of an aryloxy (alkoxy) alkane used to inhibit oxidation range from about 0.01 to about 20, and preferably 1–5, percent by weight of the composition in which it is incorporated. In lubricants, including greases, concentrations generally range from 0.25 to 10; whereas, in plastics, the concentration is generally 0.1 to 2.

Any of the anti-oxidant compounds or combinations thereof which are usefully incorporated in the polymer-containing compositions of this invention can be incorporated therein by any of various known techniques, such as by blending in a Waring Blendor, a plastograph, a kneading mixer or the like.

ILLUSTRATIVE EXAMPLES

The invention is illustrated by the following examples. All parts are by weight unless otherwise specified.

EXAMPLE 1

1 - n - butoxy - 1 - (4-methylphenoxy)ethane—To 108 grams (1 mole) of 4-methylphenol there are added drop by drop 100 grams (1 mole) of n-butyl vinyl ether during 0.25 hour while stirring the materials. The temperature is raised during the addition to 100° C., and heating and stirring are maintained for two additional hours. After removal of unreacted ether by reduced pressure distillation (heating up to 110° C., at a pressure of less than 1 mm.), there are obtained 179 grams (86%) of crude 1-n-butoxy-1-(4-methylphenoxy)ethane.

130 gram aliquot portion of this mixed acetal is washed with a 30% aqueous sodium hydroxide solution and is extracted with benzene. The extract is dried and freed of solvent by distillation. The residue is a clear liquid. Analysis of the liquid revealed carbon content, 75.68%, and hydrogen content, 9.61%. Calculated values are: carbon, 75.05%, and hydrogen, 9.69%.

The infrared spectrum of the product is consistent with the mixed acetal structure and shows it to be substantially free of phenolic hydroxyl groups.

EXAMPLE 2

1-n-butoxy-1-(1-naphthoxy)ethane—To a solution of 144.2 grams (1 mole) of 1-naphthol in 200 ml. of benzene heated at 85–90° C. there are added, while stirring, 125 grams (1.25 mole) of n-butyl vinyl ether. The addition is completed in 0.5 hour, and heating is continued for one additional hour. The reaction mixture is washed with a 20% aqueous sodium hydroxide solution. The organic part is washed with water, dried and distilled to remove benzene and unreacted ether. The residue, 171 grams (70%), of 1-n-butoxy-1-(1-naphthoxy)ethane is a clear mobile liquid. Analysis of the liquid is indicated by the following:

Calculated for $C_{16}H_{20}O_2$: C, 78.6%; H, 8.23%. Found: C, 78.4%; H, 8.26%.

The infrared spectrum of this mixed acetal is consistent with the proposed structure and is substantially free of phenolic hydroxy group absorptions.

EXAMPLE 3

1-butoxy-1-(2-naphthoxy)ethane—Following the procedure of Example 2, 125 grams of n-butyl vinyl ether are added to 144.2 grams of 2-naphthol in benzene at 88–90° C. There is obtained 116 grams (47.5%) of crude 1-butoxy-1-(2-naphthoxy)ethane, which is a clear mobile liquid.

EXAMPLE 4

1-butoxy-1-(4-phenylaminophenoxy)ethane—To a solution of 185.2 grams (1 mole) of 4-phenylaminophenol in 200 ml. of benzene heated at 85° C., there are added during one hour while stirring 125 grams (1.25 moles) of n-butyl vinyl ether. Heating and stirring at 85–87° C. are continued for one additional hour. After removal of benzene and untreated n-butyl vinyl ether by evaporation under reduced pressure (heating up to about 100° C. at a pressure of less than 1 mm.), there are obtained 231 grams (81%) of crude 1-butoxy-1-(4-phenylaminophenyl)ethane, which is a clear, dark, slightly viscous liquid. Analysis of the liquid is given below:

Calculated for $C_{18}H_{23}O_2N$: C, 75.7%; H, 8.13%; N, 4.91%. Found: C, 77.0%; H, 6.70%; N, 5.99%.

EXAMPLE 5

2,9-di-(1-naphthoxy)-3,8-dioxadecane—To a solution of 83.5 grams (0.58 mole) of 1-naphthol in 265 ml. of benzene heated at 81–85° C., there is added while stirring during 1.75 hours a solution of 41.2 grams (0.29 mole) of 1,4-di(vinyloxy)butane in 100 ml. of benzene. Heating and stirring at 81–85° C. are continued for one additional hour. Solvent is removed under reduced pressure, leaving 121 (97%) of crude 2,9-di-(1-naphthoxy)-3,8-dioxadecane.

A 6.8 gram aliquot portion of the product dissolved in benzene is washed with 20 ml. of a 10% aqueous sodium hydroxide solution for one hour. The benzene solution is washed with water, dried and freed of solvent. There remains 5.2 grams of the mixed acetal of which the infrared spectrum shows only a minor amount of hydroxyl-containing impurity to be present.

EXAMPLE 6

2,9 - di-(4-phenylaminophenoxy)-3,8-dioxadecane—To a solution of 107.5 grams (0.58 mole) of 4-phenylaminophenol in 250 ml. of benzene, there is added while stirring at 80° C. during 2 hours a solution of 41.2 grams (0.29 mole) of 1,4-di(vinyloxy)butane in 100 ml. of benzene. Heating and stirring at 80–82° C. were continued for one additional hour.

Benzene is removed by reduced pressure distillation. There remains 146 grams of clear, red liquid which is crude 2,9-di-(4-phenylaminophenoxy)-3,8-dioxadecane.

EXAMPLE 7

1-n-butoxy - 1 - (4-hydroxyphenoxy)ethane—To 48.8 grams (0.443 mole) of hydroquinone in 97 grams of 1,2-dimethoxy-ethane containing a catalytic amount of p-toluene sulfonic acid heated at 98° C., there are added during 0.5 hour while stirring 88.5 grams (0.885 mole)

of n-butyl vinyl ether. Heating and stirring are continued for one additional hour. After 1,2-dimethoxy-ethane, unreacted n-butyl vinyl ether, and p-toluene sulfonic acid are removed by distillation under reduced pressure and washing with aqueous sodium carbonate; and hydroquinone is removed by filtering, there remains about 40 grams of crude 1-n-butoxy-1-(4-hydroxyphenoxy)ethane, a clear red-brown oil.

EXAMPLE 8

1,2-di(α-butoxyethoxy)benzene—To 100 grams (1 mole) of n-butyl vinyl ether in 100 grams of 1,2-dimethoxy-ethane, there is added during 0.5 hour while stirring and heating at 98° C. a solution of 48.8 grams (0.44 mole) of catechol in 95 grams of 1,2-dimethoxy-ethane containing a catalytic amount of p-toluene sulfonic acid. Heating and stirring are continued for one additional hour. The resulting reaction mixture is cooled diluted with benzene and is washed successively with water, aqueous sodium carbonate solution and water. Benzene and unreacted n-butyl vinyl ether are removed by distillation at less than 10 mm. pressure. There remains about 120 grams of crude 1,2-di(α-butoxyethoxy)benzene, which is a clear red, moderately viscous liquid.

EXAMPLE 9

6,10-di-(1-naphthoxy)-5,11-dioxapentadecane — To a suspension of 1 mole of sodium 1-naphthoxide in benzene (prepared by the reaction of 1-naphthol with sodium metal) is added while stirring 1, 5-di-n-butoxy-1,5-dichloropentane (prepared by passing hydrogen chloride through a mixture of the bisulfite addition product of 0.5 mole of glutaraldehyde and 1 mole of 1-butanol in benzene). External heat is not applied. After a short reaction period, the reaction mixture is washed with dilute aqueous sodium hydroxide solution and extracted with water. The organic portion is separated, dried and distilled to remove benzene and any unreacted component. There are obtained 105 grams of crude 6,10-di-(1-naphthoxy)-5,11-dioxapentadecane, which is a dark amber clear oil. Analysis of the liquid is indicated by the following:

Calculated for $C_{33}H_{40}O_4$: C, 79.1%; H, 8.05%. Found: C, 76.02%; H, 8.52%.

EVALUATION

The utility of the aryloxy (alkyloxy) alkanes as antioxidants and bearing corrosion inhibitors is demonstrated by comparative tests made on lubricating oils containing the alkane additives and the same oils without the additive.

I. Antioxidant test (B–10A)—Lubricants

In this test, an alkane is added to a solvent-refined mineral lubricating oil. The oil is then heated to 163° C. and dry air at a rate of 10 pounds per hour is passed through it in the presence of iron, copper, aluminum and lead. After 40 hours, the neutralization number (NN) for each oil composition is obtained according to ASTM Method D741–1. The effectiveness of the additives is revealed by comparison of the control of viscosity increase (kinematic viscosity, KV), and control of acids (change in neutralization number), with the additive-free oil. Results of a series of tests are shown in Table I, following:

TABLE I

| Additive of Example No. | Conc., percent wt. | NN Increase | Percent KV Increase at 210° F. |
|---|---|---|---|
| (Additive-free base oil) |  | 19.5 | 374 |
| 1 (crude product) | 0.5 | 14.5 | 64 |
| 2 | 0.5 | 3.1 | 6 |
| 3 | 0.5 | 15.4 | 90 |
| 5 | 1 | 2.3 | 22 |
| 7 | 1 | 4.6 | 30 |
| 9 | 1 | 1.9 | 13.5 |

II. Antioxidant test—Lubricants

This test is similar to that described in I, directly above, however an ester lubricant, a mixture of pelargonic and valeric esters of pentaerythritol, was used and the procedure was modified by heating the lubricant to 218° C. Results of several tests are shown below in Table II.

TABLE II

| Additive of Example No. | Conc., percent wt. | NN Increase | Percent KV Increase at 100° F. |
|---|---|---|---|
| (Additive-free base oil) |  | 5–9 | 390 |
| 4 | 2 | 1.4 | 10 |
|  | 1 | 3.6 | 39 |
| 6 | 2 | 1.3 | 11 |
|  | 1 | 3.7 | 51 |

III. Bearing corrosion inhibition—Lubricants

In this test, the amount of weight loss sustained by a copper-lead bearing in a CRC L–38 engine after operation for 40 hours with an oil blend containing one percent by weight of an additive, determines the effectiveness of the additive. The weight loss must not exceed 50 milligrams (mg.) to achieve a passing rating. The oil used in this test is a solvent-refined paraffinic neutral oil having a viscosity of 200–210 S.U.S. at 100° F. and a paraffinic bright stock having a viscosity of 2650 S.U.S. at 100° F.

By way of comparison, a commercial anti-corrosion additive, A, is included to emphasize the high degree of effectiveness of the new additives of this invention. Test results are shown below in Table III.

TABLE III

| Additive of Example No.: | Weight loss, mg. |
|---|---|
| (Additive-free base oil) | 3669 |
| (Commercial additive A) | 109 |
| 1 | 19 |
| 1 (repeat) | 25 |
| 4 | 41 |

As indicated above, the alkanes represented by general Formulae I, II, III, and IV can be used to effectively stabilize numerous compositions against oxidative deterioration. Motor oils, cylinder oils, turbine oils, roll oils, emulsion-type oils, and greases, are typical lubricants which are improved by incorporating the alkanes therein. A wide variety of plastics are also similarly improved, such that they meet rigorous specifications and maintain aesthetic standards. Other materials susceptible to oxidation, mentioned above, are also improved by using the said alkanes therewith.

In order to evaluate the effectiveness of the aforedescribed alkanes and combinations thereof with a representative high-impact polystyrene in improving the oxidation resistance of the latter, samples of the polystyrene having such compounds incorporated therein were subjected to oxidation conditions similar to those encountered during conventional processing of the polystyrenes into useful configurations. For comparison purposes, samples of the same polystyrenes containing comparable amounts of other compounds which are widely used as polymer antioxidants and samples containing no antioxidant additives were subjected to the same oxidation conditions.

More specifically, the oxidation resistance of the polystyrene-containing compositions of this invention were tested by dividing a 20 gram sample of each composition among three seven-centimeter flat-bottom aluminum foil dishes (A. H. Thomas Catalog No. 4537) previously cleaned with a 1:1 mixture of acetone and toluene, and heating the sample-containing dishes for two hours at 185° C. in a forced air circulation oven having good temperature control and no local temperature nonuniformities. Thereafter, the samples were allowed to cool to room temperature, visually rated for color degradation review relative to the other samples in the same run, and then cut into strips for use in determinations of the melt index of each sample.

Melt index, as measured by ASTM Method D1238, provides a measure of the flow rate of a thermoplastic through the orifice of an extrusion plastometer under specified conditions of temperature and pressure. Comparison of such flow rates of a sample before and after exposure to oxidation conditions provides a reliable measure of the degree of oxidative degradation caused by the exposure, with a higher flow rate indicating a higher degree of oxidative degradation. Thus, the smaller the increase in melt index of a sample during exposure to oxidation conditions, the greater the oxidation resistance of the sample. Accordingly, a comparison of the increases in melt index of several samples of the same polystyrene containing no anti-oxidant, different antioxidants and/or different amounts of anti-oxidants will provide a measure of the effectiveness of each anti-oxidant relative to no anti-oxidant, other anti-oxidants and/or different amounts of the same anti-oxidant.

The following specific examples are for the purpose of illustrating the oxidation resistance of various of the novel polystyrene-containing compositions of this invention. It will be apparent that this invention is not limted to the specfic polystyrenes or anti-oxidant compounds used in the examples, but that other high-impact polystyrenes, other anti-oxidant compounds and combinations and concentrations thereof can be used, as those skilled in the art will readily appreciate.

1-n-butoxy-1-(1-naphthoxy)ethane—Example 2, above was thoroughly blended in samples of the high-impact polystyrene resin identified above. Several widely used anti-oxidants were blended in other samples of the same polystyrene in the same concentrations. One resin sample containing no anti-oxidant was used for purposes of a control run. All of the samples were placed in the aluminum dishes and subjected to the oxidation conditions described hereinbefore. Thereafter, visual observation of the colors of the oxidized samples revealed that (1) the colors of the polystyrene which included the said ethane were less degraded than that of the sample which contained no anti-oxidant, and (2) the colors of all of the samples which included the widely used anti-oxidants were more degraded than that of the sample which contained the same concentration of the ethane.

Thereafter, the melt index of the unoxidized resin and of each of the oxidized samples was measured by ASTM Test Method D1238 at 230° C. and with a weight of 1200 grams on the rod (the calculated equivalent of 24.0 p.s.i.). The results are set forth in Table IV, in which each sample is identified by the anti-oxidant which it included and the concentration in which the anti-oxidant was employed.

TABLE IV.—EFFECTIVENESS OF ANTI-OXIDANTS IN HIGH-IMPACT POLYSTYRENE

| Sample No. | Anti-Oxidant | Conc. wt. percent | Color | Melt Index | | |
|---|---|---|---|---|---|---|
| | | | | Before Oxidation | After Oxidation | Change |
| 1 | None | | Worst | 0.29 | 1.79 | 1.50 |
| 2 | Alkane, Example 2 | 0.10 | Best | 0.29 | 1.11 | 0.82 |
| 3 | Eastman BHT (phenolic) | 0.10 | Second | 0.29 | 1.45 | 1.16 |
| 4 | Tri-(2-hexadecyl) hydroquinone | 0.10 | Third | 0.29 | 1.66 | 1.37 |
| 5 | Catalin CAO-6 (phenolic) | 0.10 | Worst | 0.29 | 1.48 | 1.19 |

As revealed by data provided in Table IV, the alkane of Example 2 is substantially superior to other antioxidants in respect of color and melt index stabilization.

Although the present invention has been described with preferred embodiments, it is to be understood that modifications, and variations may be resorted to, without departing from the spirit and scope of this invention, as those skilled in the art will readily understand. Such variations and modifications are considered to be within the purview and scope of the appended claims.

I claim:
1. A composition of matter comprising
(A) an organic material prone to oxidation, and
(B) a minor amount sufficient to increase the oxidation resistance of (A), of an aryloxy (alkyloxy) alkane represented by a general formula selected from the group consisting of 1, II, III, and IV:

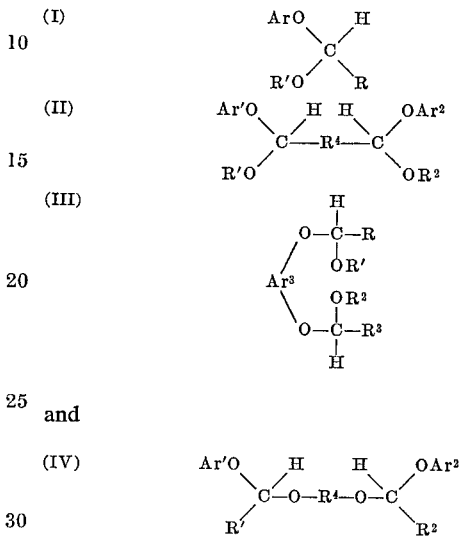

and

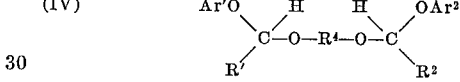

wherein R, R', R² and R³ are alkyl groups having from 1 to about 20 carbon atoms, R⁴ is an alkylene group having from 1 to about 20 carbon atoms, Ar, Ar' and Ar² are aryl groups, and Ar³ is an arylene group.

2. A composition defined by claim 1 wherein said alkane is present in amount from about 0.01 to about 20 percent by weight of the organic material.

3. A lubricant containing as an improving agent, a minor amount sufficient to inhibit oxidation thereof, of an aryloxy (alkyloxy) alkane represented by the general formula

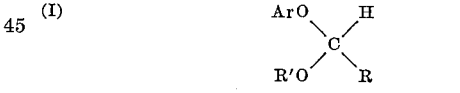

wherein R, R' and Ar are as defined in claim 1.

4. A lubricant defined by claim 3 wherein the alkane is 1-n-butoxy-(1-napthoxy)ethane.

5. A lubricant containing as an improving agent, a minor amount sufficient to inhibit oxidation thereof, of an aryloxy (alkyloxy)alkane represented by the general formula

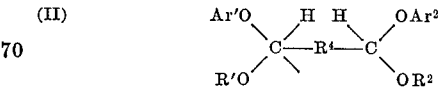

wherein R', R², R⁴, Ar' and Ar² are as defined in claim 1.

6. A lubricant defined by claim 5 wherein the alkane is 6,10-di-(1-naphthoxy)-5,11-dioxapentadecane.

7. A lubricant containing as an improving agent, a minor amount sufficient to inhibit oxidation thereof, of an aryloxy (alkyloxy)alkane represented by the general formula:

(III) 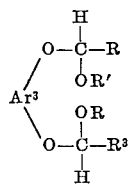

wherein R, R′, R², R³ and Ar³ are as defined in claim 1.

8. A lubricant defined by claim 7 wherein the alkane is 1,2-di(α-butoxyethoxy)benzene.

9. A lubricant containing as an improving agent, a minor amount sufficient to inhibit oxidation thereof, of an aryloxy(alkyloxy)alkane represented by the general formula:

(IV) 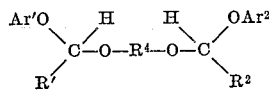

wherein R¹, R², R⁴, Ar′ and Ar² are as defined in claim 1.

10. A lubricant defined by claim 4 wherein the alkane is 2,9-di-(1-naphthoxy)-3,8-dioxadecane.

11. A lubricant defined by claim 1 wherein the vehicle thereof is a mineral oil of lubricating viscosity.

12. A lubricant defined by claim 1 wherein the vehicle thereof is an ester of lubricating viscosity.

13. A plastic susceptible to oxidative deterioration having in admixture therewith a minor amount, sufficient to inhibit oxidation thereof, of an aryloxy (alkoxy)alkane of claim 1.

14. A composition defined by claim 1 wherein the organic material is a high-impact polystyrene comprising a copolymer of styrene and a rubber.

15. A composition defined by claim 14 wherein the rubber is natural rubber.

16. A composition defined by claim 14 wherein the rubber is a synthetic rubber.

17. A composition defined by claim 1 wherein the organic material comprises a grease.

18. A grease containing as an improving agent, a minor amount sufficient to inhibit oxidation thereof of an aryloxy (alkyloxy alkane represented by the general formula (I) 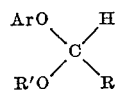

wherein R, R′ and Ar are as defined in claim 1.

19. A grease containing as an improving agent, a minor amount sufficient to inhibit oxidation thereof of an aryloxy (alkyloxy) alkane represented by the general formula (II) 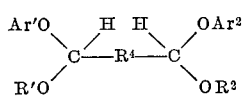

wherein R′, R², R⁴, Ar′ and Ar2 are as defined in claim 1.

20. A grease containing as an improving agent, a minor amount sufficient to inhibit oxidation thereof of an aryloxy (alkyloxy) alkane represented by the general formula (III) 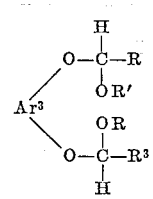

wherein R, R′, R², R³ and Ar³ are as defined in claim 1.

21. A grease containing as an improving agent, a minor amount sufficient to inhibit oxidation thereof of an aryloxy (alkyloxy) alkane represented by the general formula (IV) 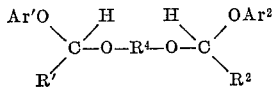

wherein R′, R², R⁴, Ar′ and Ar² are as defined in claim 1.

References Cited

UNITED STATES PATENTS

| | | | |
|---|---|---|---|
| 2,262,019 | 11/1941 | Lincoln et al. | 252—407 X |
| 2,468,309 | 4/1949 | Sibley | 260—45.7 X |
| 2,503,207 | 4/1950 | Moyle | 260—613 |
| 3,053,768 | 9/1962 | Cupper | 252—56 X |
| 3,139,443 | 6/1964 | Sosnovsky | 260—613 X |

DANIEL E. WYMAN, Primary Examiner

W. CANNON, Assistant Examiner

U.S. Cl. X.R.

252—40.5, 42, 28, 407; 260—45.7, 613

UNITED STATES PATENT OFFICE
CERTIFICATE OF CORRECTION

Patent No. 3,497,181     Dated February 24, 1970

Inventor(s) Milton Braid

It is certified that error appears in the above-identified patent and that said Letters Patent are hereby corrected as shown below:

In column 2, line 48, "A'" should read --Ar'--. In column 3, line 27, "understod" should read --understood--. In column 4, line 41, "mixture" should read --mixtures--. In column 4, line 45, "forimng" should read --forming--. In column 4, line 69, "salcium" should read --calcium--. In column 6, line 31, "untreated" should read --unreacted--. In column 7, lines 50 and 51, "additive" should read --additives--. In column 9, line 25, "specfic" should read --specific--. In column 10, line 7 (Claim 1), "1" should read --I--. In column 11, line 46 (Claim 18), "(alkyloxy" should read --(alkyloxy)--.

SIGNED AND SEALED

JUL 28 1970

(SEAL)
Attest:

Edward M. Fletcher, Jr.
Attesting Officer

WILLIAM E. SCHUYLER, JR.
Commissioner of Patents